(12) United States Patent
Walters et al.

(10) Patent No.: US 6,633,052 B2
(45) Date of Patent: Oct. 14, 2003

(54) DISCRIMINATING PAPER SENSOR

(75) Inventors: Alan Walters, Glos (GB); Simon M. Derricutt, Glos (GB)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/042,333

(22) Filed: Jan. 11, 2002

(65) Prior Publication Data

US 2003/0132403 A1 Jul. 17, 2003

(51) Int. Cl.[7] ............................................... G01N 21/86
(52) U.S. Cl. ............... 250/559.4; 250/559.46; 250/556; 356/71
(58) Field of Search ................. 250/559.4, 559.41, 250/559.46, 556, 221, 338.1, 341.8; 356/71, 429, 430, 239.1, 238.1; 340/555, 556, 557

(56) References Cited

U.S. PATENT DOCUMENTS

| | | | | |
|---|---|---|---|---|
| 4,405,858 A | * | 9/1983 | Spratte | 250/221 |
| 4,547,896 A | * | 10/1985 | Ohtombe et al. | 382/135 |
| 4,670,647 A | | 6/1987 | Hubble, III et al. | 250/214 AG |
| 4,902,887 A | * | 2/1990 | Everett, Jr. | 250/221 |
| 5,139,339 A | | 8/1992 | Courtney et al. | 356/446 |
| 5,414,269 A | * | 5/1995 | Takahashi | 250/559.4 |
| 2002/0074528 A1 | * | 6/2002 | O'Connor et al. | 250/559.4 |

FOREIGN PATENT DOCUMENTS

JP 02027240 A * 1/1990 ........... G01N/21/88

* cited by examiner

Primary Examiner—Diego Gutierrez
Assistant Examiner—Lydia M. De Jesús
(74) Attorney, Agent, or Firm—W. Henry

(57) ABSTRACT

A paper sensor uses two sample and hold circuits which are fired by the phase and antiphase of an oscillator that also drives an infrared light emitting diode (LED). These circuits sample the output from a phototransistor. If the outputs from the phototransistor are different when the LED is lit and unlit, then a comparator will give an output, thus synchronously filtering out unwanted infrared light that may cause a false paper reading.

13 Claims, 3 Drawing Sheets

DISCRIMINATING PAPER SENSOR

BACKGROUND OF THE INVENTION

1. Field of the Invention

This invention relates to media sensors, and more particularly, to a sensor that uses the same integrated circuit to detect a signal as to produce it.

2. Description of Related Art

Optical sensors are often used in applications to determine the presence of a copy sheet or document passing through a certain point by providing a suitable signal in response to the copy sheet. Typically, the optical sensor includes a light source whose light beam is directed at the position at which the document is to be sensed. A light sensitive transducer, for example, a phototransistor or photodiode, is mounted in alignment relationship with the light source.

A recurring problem in printing machines is a false reading from a sensor due to not filtering out unwanted infrared light. Another problem is the contamination of optical sensors, particularly those in the paper path, by airborne toner particles, paper fibers, carrier particles, and other contaminants. These contaminants generally cause failure by coating the optical elements, thereby greatly reducing he illumination level at the sensor.

Another problem is degradation of optical sensors through aging of the light source with a corresponding decrease in light output in the sensing region.

U.S. Pat. No. 4,670,647 issued Jun. 2, 1987 to Hubble et al. is concerned with a self-adjusting document sensor compensating for degradation of the sensor system. A suitable light source and a detector are provided, the output of the detector being fed into an amplifier whose gain depends upon a feedback signal. Periodically, the output of the amplifier is compared to a reference. If the output of the amplifier falls below the reference, a pulse is sent to a ripple counter whose digital output is fed back to the amplifier to change the gain of the amplifier. If the detector is an unbiased photodiode operating in the transconductance mode, the leakage currents and their subsequent effect on output with amplifier gain changes will be minimized.

A media discriminating and media presence sensor is shown in U.S. Pat. No. 5,139,339 issued Aug. 18, 1992 that can detect and discriminate between paper and transparency uses a light emitting diode and two detectors configured so as to measure both diffuse and specular reflectivity of the media, and a media support surface that suppresses unwanted reflections.

Even though the above-mentioned prior art is useful, there is still a need, in printers for a sensor that lessens the risk of false paper readings.

SUMMARY OF THE INVENTION

Accordingly, pursuant to the features of the present invention, a sensor is disclosed that answers the above-mentioned problem by using two sample and hold circuits which are fired by the phase and antiphase components of an oscillator that also drives an infrared light emitting diode (LED). The output from a phototransistor that is optically coupled, via the paper to be sensed, to this LED is thus compared when the LED is both active and inactive thus filtering out unwanted infrared light that may cause a false paper reading.

BRIEF DESCRIPTION OF THE DRAWINGS

The foregoing and other features of the instant invention will be apparent and easily understood from a further reading of the specification, claims and by reference to the accompanying drawings in which like reference numerals refer to like elements and wherein:

Figure 1:
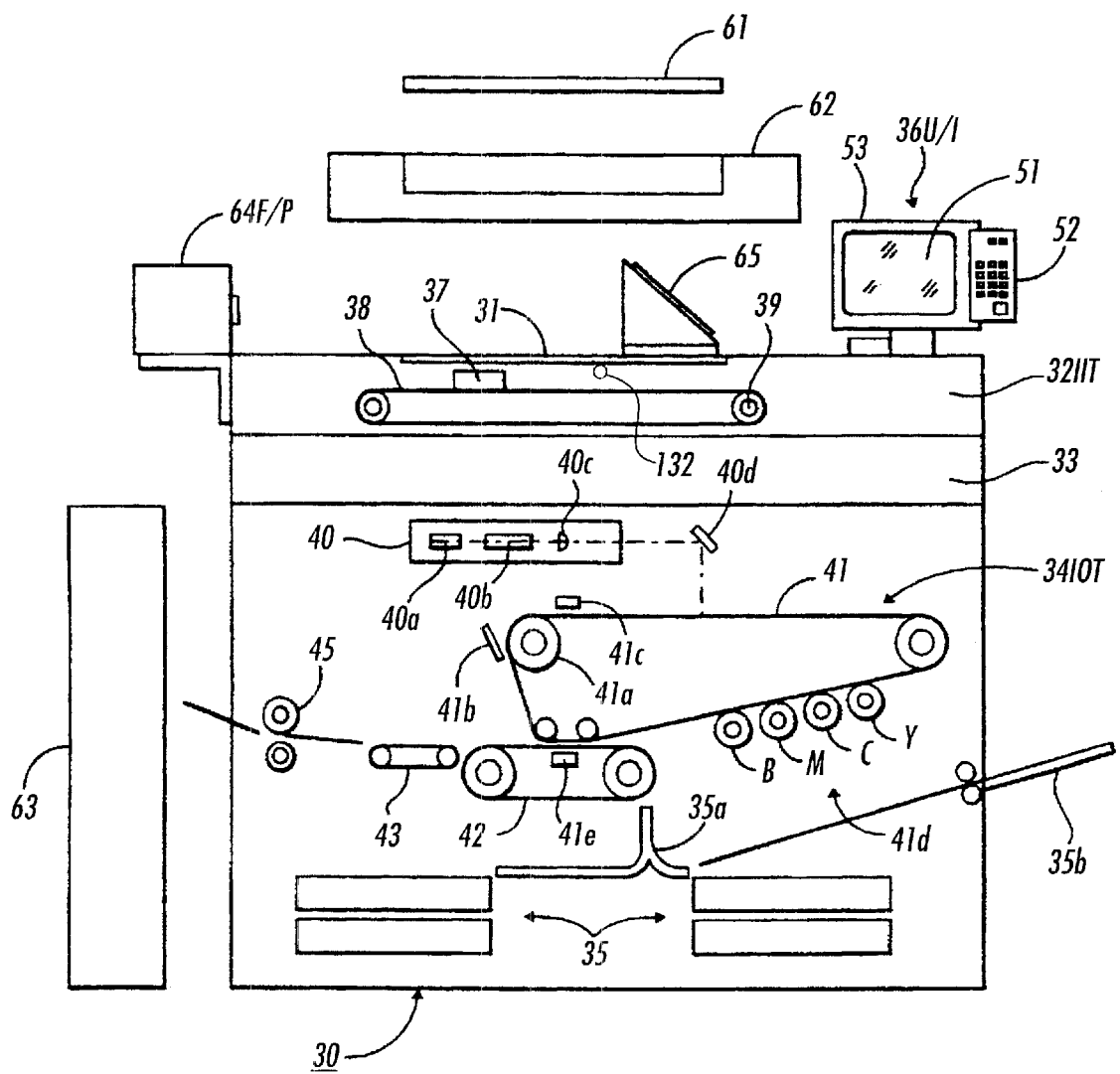
FIG. 1 is a schematic elevational view depicting various operating components and subsystems of a typical machine incorporating the paper sensor of the present invention.

While the present invention will be described hereinafter in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

The invention will now be described by reference to a preferred embodiment of the discriminating paper sensor in the environment of a printing machine. However, it should be understood that the paper sensing system of the present invention could be used with any machine in which paper sensing is desired.

For a general understanding of the features of the present invention, reference is made to the drawings. In the drawings, like reference numerals have been used throughout to identify identical elements.

FIG. 1 shows one example of the overall construction of a color copying machine to which this invention is applied. A typical color copying machine to which this invention is applied is formed with the base machine 30, composed of platen glass plate 31, which carries the original sheet thereon, and image input terminal (IIT) 32, and electrical control system container 33, the image output terminal (IOT) 34, and a paper tray 35, and a user interface (UI) 36 and also, as optional items, of an editing pad 61, and automatic document feeder (ADF) 62, a sorter 63, and a film projector (FP) 64 and screen unit 65. Sensor 132 is flush mounted with respect to platen 31 and in accordance with the present invention is less prone to false paper readings as the sensor discriminates against natural or man made light.

Electrical hardware is necessary for performing the control of the IIT, IOT, UI, etc. mentioned above, and a plural number of boards for control of each of the processing units, such as the IIT, IPS, UI, FP, and so forth, which perform the image-forming process for the output signals from the IIT, and these are accommodated further in the electrical control system container 33.

The IIT 32 is composed of an imaging unit 37, the wire 38 for driving the said unit, the driving pulley 39, and so forth, and IIT 32 reads a color original sheet of each of the primary colors B (Blue), G (Green), and R (Red) by means of a CCD line sensor and a color filter provided inside the imaging unit 37, converts the data so obtained into digital image signals and then outputs the signals to the IPS.

In the IPS, the B, G, and R signals mentioned above are transformed into the primary colors of the toner, i.e., Y (Yellow), C (Cyan), M (Magenta), and K (Black), and then with various data processing being applied to the data so obtained for the purpose of enhancing the reproduction fidelity and fineness, and so forth, the IPS converts the toner signals of the process color in harmonious gradation into binary toner signals and outputs them to the IOT 34.

The IOT 34, which is provided with a scanner 40 and a photo-sensitive belt 41, converts the image signals from the above-mentioned IPS into optical signals in the laser output part 40a and forms a latent image corresponding to the image of the original sheet on the photosensitive material belt 41 by way of the polygon mirror 40b, the lens 40c, and the reflective mirror 40d. The photosensitive material belt 41, which is driven by the driving pulley 41a, has a cleaner 41b, a charging unit 41c, the individual developing devices for Y, M, C, and K, and a transfer device 41e arranged around it. And, opposite to this transfer device 41e is provided a transfer unit 42, which takes into it the sheet that comes transported to it from the paper tray 35 via the paper transport channel 35a and transfers the colors in the order of Y, M, C, and K, the transfer unit 42 being rotated four turns, for example, for full color copying in four full colors. The sheet of paper on which the image is so transferred is then transported from the transfer unit 42 via the vacuum transport device 43 to the fixing device 45, where it is fixed, and is thereafter discharged from it. Moreover, the paper transport channel 35a is so designed as to accept the paper fed alternatively from the single sheet inserter (SSI) 35b.

Figure 2:
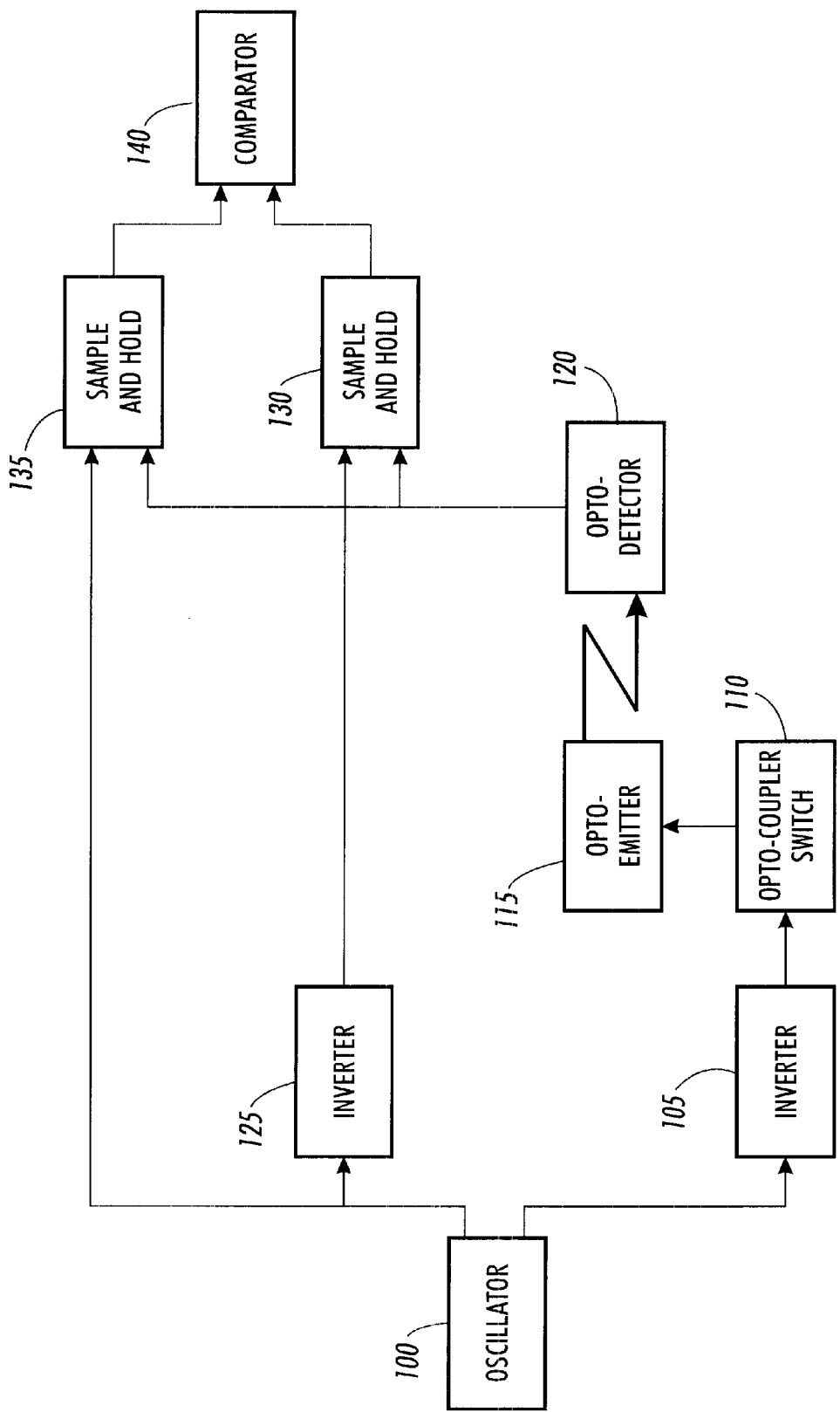
FIG. 2 is a block diagram depicting the function of the paper sensor used in FIG. 1.

The UI 36 is designed for use by the user for making the selections of the desired functions for giving instructions regarding the conditions for the execution of the selected functions, and this system is provided a color display unit 51 and a hardware control panel 52 installed by the side of the said display unit, and it is further combined with an infrared ray touch board 53, so that instructions can be given directly with the "soft buttons" on the screen. A functional block diagram of the paper sensor of the present invention is shown in FIG. 2 and is an improvement over prior art paper sensors in that the sensor is designed to change the logic state of its output (logic 1 to logic 0) when paper is detected by a reflective interrupter or opto-detector 120. By using dual sample and hold circuits 130 and 135, only infrared light that has been sent from an opto-emitter 115 can be electronically selected. An oscillator 100 drives both sample and hold circuits, but only one of these circuits is ON at any one time, as the oscillator drive to the sample and hold circuit is passed through an inverter 125 or 105 and so is antiphase.

When no paper is present, the sample and hold circuits are, therefore, alternately sampling no effective output from the opto-emitter. The output of one of these sample and hold circuits is slightly biased so that comparator 140 is always at logic 1 output. The output from oscillator 100 is also separately inverted in block 105 and then used to drive a Mosfet or opto-coupler switch 110, switching it ON and OFF. Switch 110, in turn, switches an opto-emitter 115 part of reflective interrupter 120 OFF and ON, every oscillator half cycle. Thus, one of the sample and hold circuits is ON at the same time the opto-emitter 115 is ON, and the other sample and hold circuit is OFF when the opto-emitter is ON. Because everything is driven from the same oscillator, it is the same sample and hold circuit that will always be "in step" with the opto-emitter, while the other sample and hold circuit will always be OFF when the opto-emitter is ON.

When paper is placed in proximity to sensor 132, the sample and hold circuit that is in step with the emitter will be detecting reflected infrared, while the other sample and hold circuit will not, as the emitter will be OFF when this sample and hold circuit is ON. The outputs of the sample and hold circuits, therefore, differ when paper is detected by the reflective interrupter 120. Once the charge on the storage (hold) capacitors has become sufficiently different to overcome the bias applied to comparator 140, the comparator will change state and this change in state can be used to indicate that paper is present. If another form of light happens to fall on the sensor, both sample and hold circuits will alternately detect this light, their outputs do not significantly change from each other, and the comparator bias is not overcome. By this method, false triggering is prevented. Once paper is removed, the charge on the "hold" capacitor falls, and when both sample and hold outputs are again close to each other, the comparator changes state again to indicate no paper is present.

Figure 3:
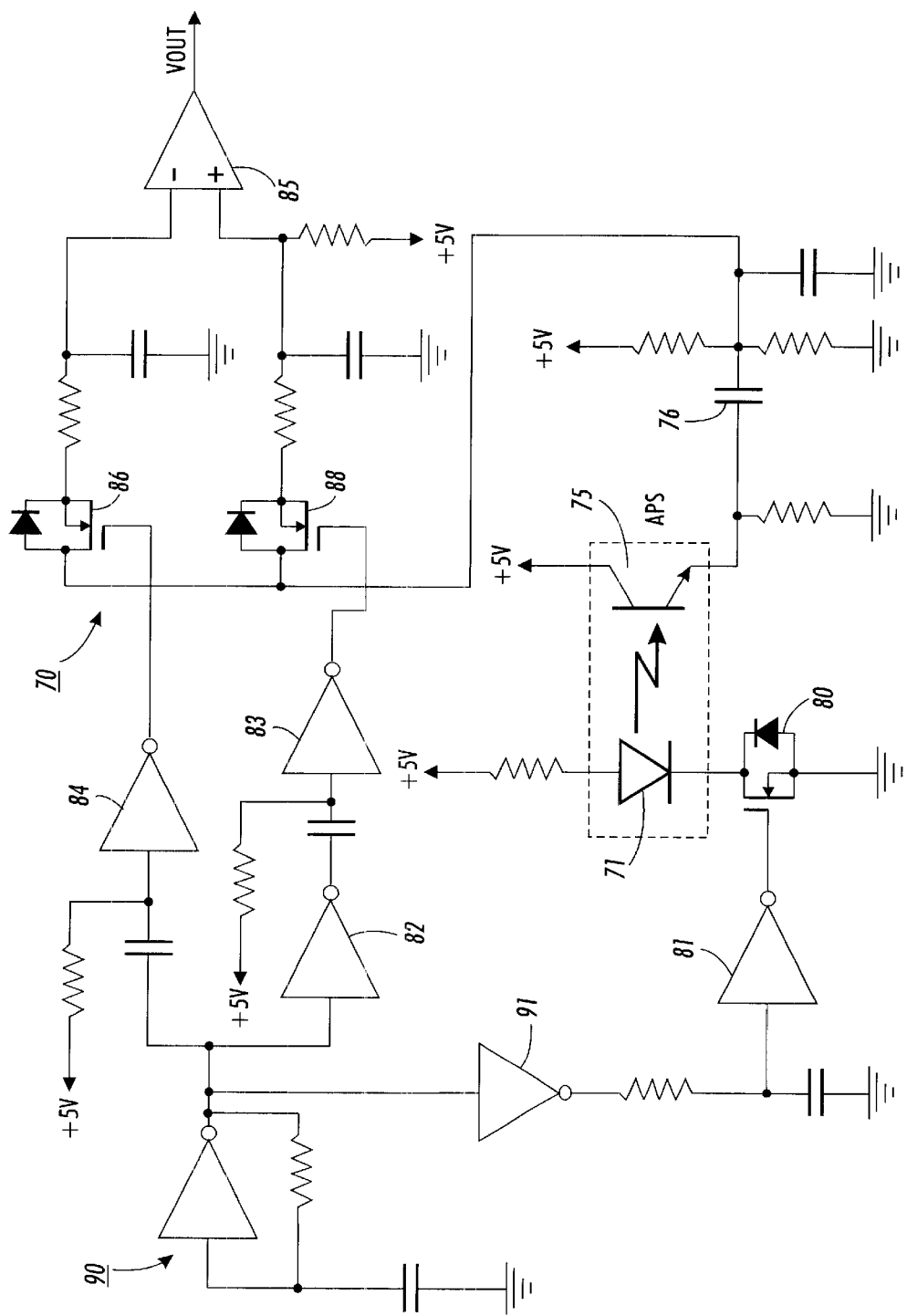
FIG. 3 is a schematic of the sensor circuitry in accordance with the present invention.

With reference to FIG. 3, there is shown an electrical schematic of a sensor control in accordance with the present invention. In particular, there is shown an LED paper sensor system that uses the same integrated circuit to detect a signal as to produce it. This results in a low cost sensor which employs filtering based on a time differential principle to reject unwanted frequencies, such as, those created by artificial light. This reduces the chances of ghost detection. Generally, in circuit 70, infrared light from LED paper sensor 132 (shown as APS in the circuit) is modulated and then the detected light is filtered to see if the modulation is the same as the LED. A power supply (not shown) applies about 5 volts through a resistor to LED 71 and then to FET 80. Oscillator 90 turns Mosfet or FET gate 80 ON via a phase delay that compensates for the rise and fall times of the LED/photodiode pair 71 and 75. FET gate 80 is also connected to Schmitt inverters 91 and 81. When FET 80 turns ON and OFF current flows and does not flow and light is modulated. The light is bounced off a document on platen 31 and goes to a phototransistor 75 and when the light strikes the base of the phototransistor a small current flows through the device that is concomitant with the LED modulation. This voltage goes through a blocking capacitor 76 that blocks D.C. and then is applied to sample and hold FET sources 86 and 88. Voltage from oscillator 90 goes through Schmitt inverter 84 to the gate of FET 86 and through two Schmitt inverters 82 and 83 to the gate of FET 88. Outputs from the drains of FETs 86 and 88 are filtered and compared at comparator 85. A difference between the two inputs will be due only to the light from LED 75, thus filtering out unwanted infrared light that may cause a false paper reading.

It should now be understood that an improved paper sensor has been disclosed in the form of a surface mounted infrared LED. False detections are reduced with this sensor by sensing temporal coincidence between LED pulses and LED illumination reflected by a sheet of paper.

While the invention has been described in conjunction with the specific embodiments outlined above, it is evident that many alternatives, modifications and variations will be apparent to those skilled in the art. Accordingly, the preferred embodiments of the invention as set forth above are intended to be illustrative and not limiting. Various changes may be made without departing from the spirit and scope of the invention as defined herein.

What is claimed is:

1. A system for sensing the presence or absence of an object at a sensing station, comprising:

an infrared light emitting diode positioned at said sensing station and adapted to project an infrared beam onto an object positioned at said sensing station;

a phototransistor adapted to receive light from said light emitting diode and transmit a signal;

an oscillator, said oscillator being adapted to activate said light emitting diode;

first and second sample and hold circuits adapted to be driven by phase and antiphase from said oscillator to sample said signal from said phototransistor and wherein said oscillator is adapted to provide an input current to each of said first and second sample and hold circuits; and a comparator for comparing outputs from said first and second sample and hold circuits, and wherein if said sampling frequencies coincide with said oscillator frequency said comparator gives off an output indicating the presence of an object at the sensing station.

2. The system of claim 1, wherein if said sampling frequencies do not coincide with said oscillator frequency said comparator changes state to indicate the absence of an object at the sensing station.

3. The system of claim 1, including a series of inverters positioned between said oscillator and said first and second sample and hold circuits.

4. The system of claim 3, wherein one of said sample and hold circuits is ON at the same time said light emitting diode is ON, and the other sample and hold circuit is OFF when said light emitting diode is ON.

5. The system of claim 4, wherein outputs from said sample and hold circuits differ when an object is detected by said light emitting diode.

6. A sensor device for sensing the presence of an object at a sensing station, comprising:

an infrared light emitting diode positioned at said sensing station and adapted to project an infrared beam onto an object positioned at said sensing station;

a phototransistor adapted to receive light from said light emitting diode and transmit a signal;

an oscillator;

first and second sample and hold circuits adapted to be driven by phase and antiphase from said oscillator to sample said signal from said phototransistor and;

a comparator for comparing outputs from said first and second sample and hold circuits to thereby indicate the presence of an object at the sensing station.

7. The sensing device of claim 6, wherein said oscillator is adapted to activate said light emitting diode.

8. The sensor device of claim 7, wherein said oscillator is adapted to provide an input current to each of said first and second sample and hold circuits.

9. The sensing device of claim 8, wherein if sampling frequencies from said first and second sample and hold circuits coincide with frequencies from said oscillator said comparator gives off an output indicating the presence of and object at the sensing station.

10. The sensor device of claim 9, including a series of inverters positioned between said oscillator and said first and second sample and hold circuits.

11. A discriminating substrate sensor, comprising:

an opto-emitter adapted to transmit infrared light toward a substrate;

an opto-detector adapted to receive light from said opto-emitter and transmit an output;

an oscillator;

a pair of sample and hold circuits, said sample and hold circuits being fired by the phase and antiphase of said oscillator to sample said output from said opto-detector; and a comparator, and wherein if outputs from said opto-detector are different when said opto-emitter is lit and unlit, then said comparator will give an output, thus indicating the presence of a substrate while simultaneously synchronously filtering out unwanted infrared light that may cause a false substrate reading.

12. The substrate sensor of claim 11, wherein said oscillator drives said opto-emitter.

13. The substrate sensor of claim 12, including at least one inverter positioned between said oscillator and said sample and hold circuits and between said oscillator and said opto-emitter.

* * * * *